Patented May 9, 1933

1,907,424

UNITED STATES PATENT OFFICE

PAUL MANNING, OF WEST SPRINGFIELD, MASSACHUSETTS

CHEMICAL COMPOSITION

No Drawing.   Application filed March 5, 1929.  Serial No. 344,586.

This invention relates to improvements in a chemical association of matter and is directed more particularly to odoriferous compositions.

In order to facilitate a clear understanding of the novel features of the invention to be hereinafter more fully disclosed, reference will first be made to the perfume making art.

As is well known perfume is a mixture of certain elements or constituents each of which is selected for its particular function. For instance, a characteristic note substance like carnation, a sweetening or secondary note constituent like vanilla and a fixative are mixed with alcohol. The sweetener or secondary note is more or less optional being used when necessary to vary the primary note or carnation odor in the example. The fixative which may be in the form of a gum has for its purpose the retardation of the diffusion of the odor and heightening the same while the alcohol functions in the nature of a common solvent for the constituents and as a carrier therefor.

It has been discovered that the so-called "note" substances include what may be termed "non-odorous" parts which may have the effect of limiting the effectiveness of the note.

This invention has among its objects the provision of a composition wherein the full odoriferous effect of the note may be obtained and is accomplished according to the novel features of the invention by employing a fixative which in addition to its fixative characteristics has valuable properties for certain other purposes as will appear.

According to the novel features of the invention in its broad aspect, I employ chlorides of aluminum and the like, and cerium, cerium nitrate, cerium oxalate, and oxalates of related metals, such as, lanthanum, neodymium, praseodymium and the like yellow oxalates of cerium, in combination to provide a so-called fixative, and a characteristic note substance either natural or synthetic in an admixture and when necessary or desirable a sweetener or secondary note is used. In one way the invention may be carried out when aluminum and cerium are combined in a water solution and the note substance added thereto. By yellow oxalate of cerium it is intended hereinafter to refer to the commercial cerium oxalate which is more or less contaminated with oxalates of metals in the same chemical grouping, such as oxalate of lanthanum, neodymium, praseodymium, etc.

According to the invention the water solution of aluminum and cerium may be termed a fixative and as one feature provides a deodorant which when applied to the skin will denaturize the odor character of the perspiration excreted as well as control and retard the rate of flow of moisture from the gland orifices.

With respect to the note substance both aluminum and cerium function as a fixative to a greater or less extent. Also each of itself controls to more or less degree the flow of perspiration. When combined however they function in both respects to a greater degree than a mere simple cumulative effect such as would be expected by adding them together. It may be said that one plays a catalytic role in the presence of the other.

The fixative mentioned also functions to throw down and separate the inert or non-odorous portion of the note substance from the odoriferous portion so that the latter may readily combine with the fixative to provide the composition of the invention.

According to another feature of the invention the fixative, which functions as a perspiration control and deodorant, has a chemical affinity with respect to the odoriferous substance so that the same attains high and novel dissociation uniformly throughout the fixative. Also the particular chemical reaction produces a composition wherein the odoriferous substance is made more thoroughly available for liberation than is the case with perfumes of the prior art.

This may be accounted for by the fact that since the fixative is adapted to separate the odoriferous and non-odoriferous constituents the effect of the former becomes more pronounced, at least the diffusion of odor is not longer restricted by the inert non-odoriferous element.

As the combined fixative and odoriferous composition is applied to the skin the former functions to control the rate of flow of perspiration as has been described while the odoriferous substance is uniformly liberated from the fixative, the bond between which is affected or partially freed by the perspiration. In this way not only is the rate of flow of the perspiration controlled but the perspiration itself controls the rate of diffusion of the odor of the substance.

As will be observed there is provided a composition wherein an odoriferous substance and a fixative are combined in a novel way so that each may function for a particular purpose yet by reason of their special characteristics they function as a whole to produce the results required of such a preparation by those who buy in trade. It will be noted that the fixative substance such as the gum dissolved in alcohol of the prior art is not used, whereby any objections in connection therewith are overcome.

The admixture may be accomplished by trituration, maceration, expression, percolation or any of the well known methods under certain pressure and temperature conditions.

According to the preferred form of the invention such temperature and pressure conditions will be maintained for the mixing as will result in the desired bond or union between the fixative components and odoriferous substance so as to obtain the advantages of the chemical affinity referred to which allows the slow diffusion of the odoriferousness, whereby fragrance may emanate from the composition for a longer period than obtains in connection with present day preparations, and whereby a less amount of perfume material may be used to give an odor value equivalent to a perfumed substance treated under present-day methods.

For instance in a specific way the admixture is brought about as follows; a vessel containing one part of the "yellow oxalates" of cerium, lanthanum, neodymium and related metals in ten parts of an aqueous solution of aluminum chloride of specific gravity 1.024 is placed in an autoclave fitted with an agitator and a pressure of fifty pounds per square inch and a temperature of 160 degrees C. are maintained for about 48 hours.

I am aware that the invention may be practised in various ways without departing from the scope of the invention and I prefer therefore to be limited by the appended claims rather than by the foregoing description.

What I claim is:

1. A chemical composition comprising in combination, an odoriferous substance chemically associated with a fixative element which includes aluminum chloride and oxalates of cerium and related metals.

2. A stable composition for controlling perspiration, consisting of aluminum chloride, yellow oxalate of cerium, and water.

3. A composition for controlling perspiration, consisting of a stable solution made up of a saturated solution of yellow oxalate of cerium in an aqueous solution of aluminum chloride of sp. gr. 1.12.

In testimony whereof I affix my signature.

PAUL MANNING.